March 11, 1930.  L. RIVES  1,750,051
WIND INSTRUMENT
Filed Aug. 17, 1927   2 Sheets-Sheet 1
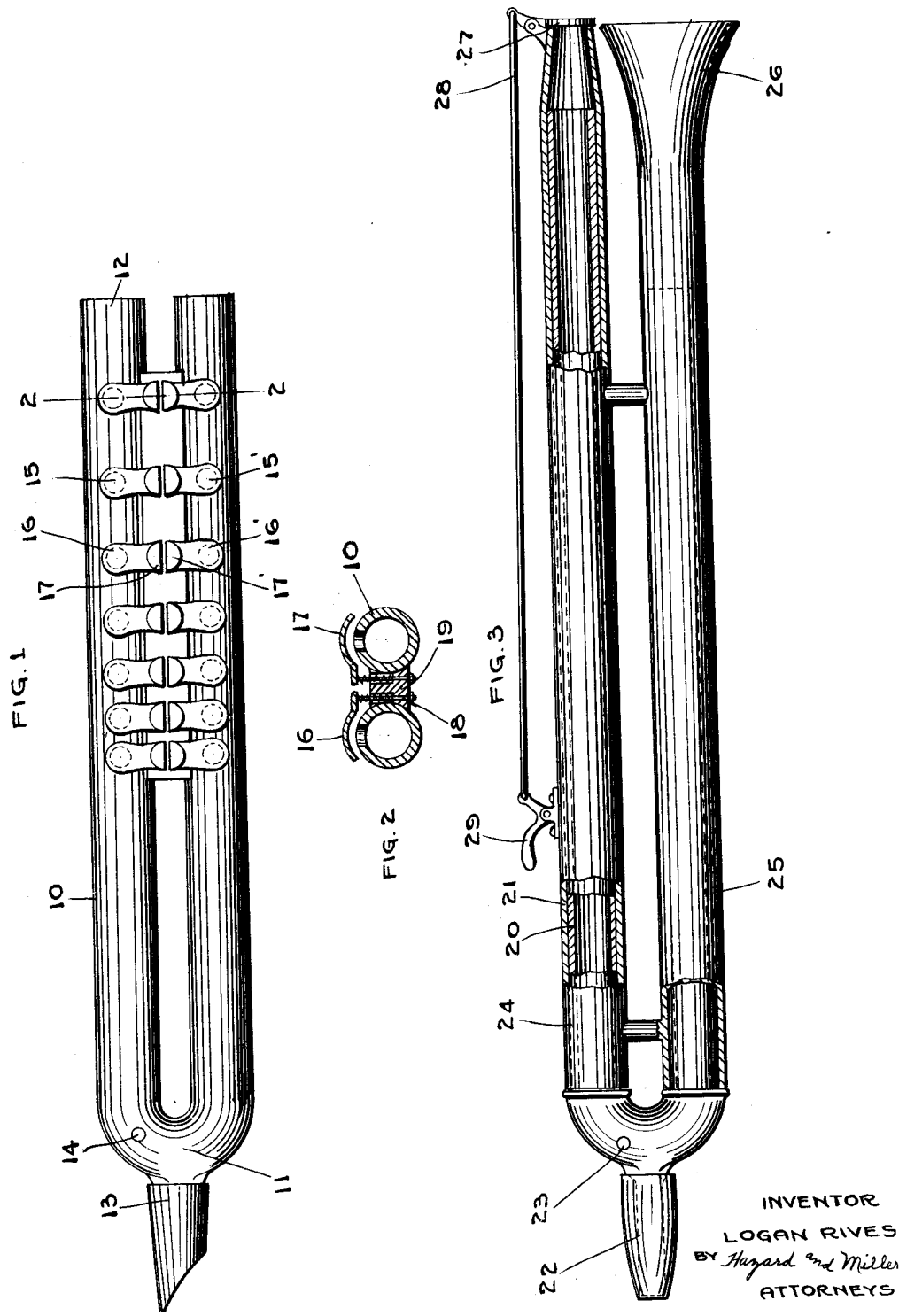
INVENTOR
LOGAN RIVES
BY Hazard and Miller
ATTORNEYS

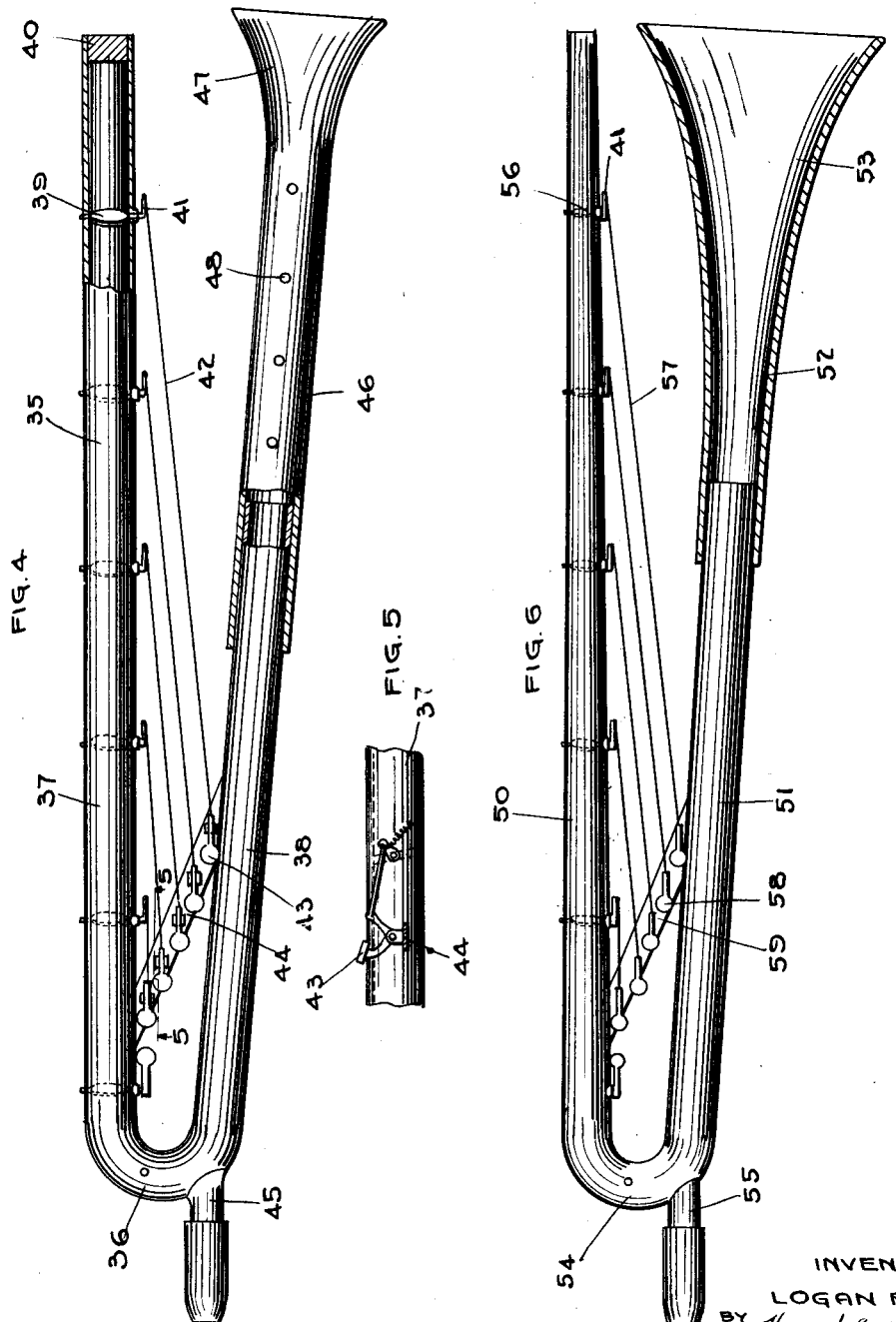

Patented Mar. 11, 1930

1,750,051

UNITED STATES PATENT OFFICE

LOGAN RIVES, OF LOS ANGELES, CALIFORNIA

WIND INSTRUMENT

Application filed August 17, 1927. Serial No. 213,541.

This invention relates to improvements in musical instruments, and particularly to wind instruments. Heretofore, in so far as I am aware, all wind instruments have the following general characteristics. They are tubular, the tube being cylindrical or conical, with a mouthpiece or exciter of vibrations located at one end. Some instruments are open at both ends and some are open at one end. In instruments of cylindrical bore open at one end and having the exciter of vibrations at the closed end, the air column will vibrate in such a manner that there will always be a node or point of greatest pressure and least motion at or near the closed end, and a loop or point of greatest motion and of least pressure at or near the open end. The position of the node and loop being fixed, the air column can be made to divide into thirds, fifths, sevenths and so on by causing the formation of intervening nodes and loops.

In instruments consisting of cylindrical tubes open at one end, the fundamental wave length is twice the tube length. The fundamental tone and the odd harmonics only are used for the production of musical tones.

In instruments of conical bore open at one end or both ends, the air vibrates as a cylindrical tube open at both ends. There is a node in the center and a loop at each end. The position of the loop at the ends being constant, the air column can be made to divide into seconds, thirds, fourths and fifths or any number of equal parts thus sounding the second, third, fourth and fifth harmonics. The fundamental tone will be that of a wave length equal to the length of the tube.

I have found that it is not necessary that the exciter of vibration be placed at the end of the tube, but that it may be placed at the side of the tube between the ends. The vibrations caused by it in the air column within the tube will have the same characteristics as those produced by an exciter placed at the end of the tube. By this construction it is possible to have an instrument in the form of a tube open at one end or a tube open at both ends. Instruments thus constructed having a cylindrical bore closed at one end, will vibrate as cylindrical tubes open at one end. They can use only the odd harmonics, that is, the third, fifth, seventh, ninth and so on. Instruments open at both ends can produce all of the harmonics, that is, the second, third, fourth, fifth, sixth and so on. The purpose of this invention is to enable instruments to be constructed upon new and improved lines. Both kinds of instruments can be constructed, namely, instruments having cylindrical bore or instruments having a conical bore. Either kind of instrument may be open at one end or may be open at both ends. In all instruments, the exciter of vibration may be a single beating reed such as is used in the clarinet type of instruments, or the double reed such as is used in the bassoon, or it may be a cupped or funnel-shaped mouthpiece such as is used in the trumpet horn or trombone, using the lips as vibrators. In connection with any type of exciter, a syrix or speaker hole may be used to facilitate the selection of the harmonic to be sounded.

With the foregoing and other objects in view, which will be made manifest in the following detailed description and specifically pointed out in the appended claims, reference is had to the accompanying drawings for an illustrative embodiment of the invention, wherein:

Figure 1 is a view in elevation, illustrating one form of the improved musical instrument embodying my invention.

Fig. 2 is a section taken upon the line 2—2 of Fig. 1.

Fig. 3 is a view in elevation, the parts being broken away and shown in section illustrating a modified form of musical instrument.

Fig. 4 is a view in elevation, the parts being broken away and shown in section, illustrating another form of the invention.

Fig. 5 is a view taken substantially along the line 5—5 upon Fig. 4.

Fig. 6 is a view and elevation, the lines being broken away and shown in section, illustrating a further form of the invention.

Referring to the accompanying drawings wherein similar reference characters designate similar parts throughout, and referring particularly to Figure 1, the instrument consists of a cylindrical tube 10 which may be formed of any desirable material and which is bent upon itself centrally at 11. This tube has open ends 12, and the exciter or means of vibrating is indicated at 13. The particular means of vibrating the instrument is immaterial. It may be a single reed similar to that employed upon a clarinet or saxophone, or a double reed such as is used upon the oboe or bassoon; or further, it may be a trumpet mouth-piece. It will be noted that the exciter 13 is located exactly at the center of the tube 10. Near the exciter is pierced the speaker hole 14 which is common to many types of instruments, its function being to facilitate the sounding of the desired harmonic. The tube 10 is pierced at equal distance from the open ends, forming six pairs of apertures 15 and and 15'. The fundamental note of the instrument is sounded when all apertures are closed. The apertures are closed by pressure of the fingers on keys 17 which are mounted on the upper ends of spring actuated guides 18 carrying closures 16 and 16'. The guides 18 are slidable in parts 19 connecting the parallel sides of the tube 10. The apertures 15 and 15' are so located that when successively opened, beginning at the open ends of the instrument, they will sound the diatonic scale, ascending to the seventh. Thence, by using the second harmonic, the scale may be repeated an octave higher and by using the fourth harmonic the scale can be again repeated the second octave higher. The same keys sound the same note at all pitches or on all octaves. As the keys 17 on the closures 16 and 16' are very close together, it will be noted that one finger manipulates a pair of keys 17 so that one finger can simultaneously close any pair of apertures 15 and 15'. Opening any pair of apertures gives the note of the diatonic scale, and if the flat of a note is desired, only one aperture is opened. The pairs of keys correspond to white keys on the piano, while the single keys of the pairs, correspond to the flats, thus giving all chromatic intervals.

In the modification shown in Figure 3 there is a slide instrument. It consists of a cylindrical tube 20 formed into a return bend 21. The exciter of vibrations indicated at 22 is placed centrally, and the speaker hole 23 is pierced near it. Upon the ends of the bent tube there are placed two sliding tubes, one sliding tube being located on each side of the exciter. These sliding tubes are indicated at 24 and 25 respectively. On the end of one of these slides is formed a bell 26. The outer end of the other sliding tube is closed by a flat valve 27, operable in any suitable manner such as by a rod 28 connecting it to a lever or key 29. When the slide is fully extended, it gives the lowest note which can be produced by the instrument. The ascending diatonic scale and chromatic intervals are then made by shortening the instrument by means of the slide. This type of instrument can be used as a tube open at one end or as a tube open at both ends. If the instrument when fully extended is thirty-six inches long, its fundamental tone will be six foot F when the flat valve 27 closes one end of the tube. If the flat valve 27 is opened, the instrument will act as a tube open at both ends and the fundamental tone will be three foot F. This type of instrument uses all of the harmonics, both odd and even, and has a great compass, namely, four to six octaves. All notes in this type of instrument are bell notes which is made possible for reed instruments by the invention. It is a decided improvement over all existing types of instruments, as the bell notes are far superior both in timbre and power, to notes produced by an instrument which is an apertured tube.

In the modification disclosed in Figure 4, there is a cylindrical tube 35 which is reversely bent upon itself as at 36, providing two portions 37 and 38 which are approximately parallel to each other. In the portion 37 there are butterfly valves 39 arranged at suitable intervals, and the outer end of this portion is normally closed as indicated at 40. The butterfly valves 39 are provided with cranks 41 which are connected by means of rods or equivalent devices 42 to keys or levers 43 arranged upon a key-board or bridge 44 connecting the portions 37 and 38. The exciter or mouthpiece 45 is located at the bend 36 but is slightly shifted over so as to be directed toward the open end of the tube section 38. On the outer end of the tube section 38 there is slidable an outer tube 46 which is belled as indicated at 47, and has four apertures 48 formed in it. It will be understood that the number of apertures 48 in this instrument depends upon the number of butterfly valves 39. If there are six butterfly valves there will be four apertures. This instrument having one end of the tube normally closed as at 40, vibrates as a tube which is closed at one end. By pressing the keys or levers 43 consecutively, the length of the tube will be shortened by the butterfly valves 39 being closed. When one harmonic is being used, the closed end of the tube section 37, together with the butterfly valves 39 will produce seven different notes. In order to obtain a half tone, that is, a sharp or a flat, the tube 46 is moved either outwardly or inwardly upon the tube section 38, it being understood that by moving it outwardly the length of the tube is increased slightly, thus producing a flat, and by shifting the tube 46 toward the mouthpiece 45 from its normal position, a sharp will be produced. The purpose of the apertures 48 which can be opened and closed by any suitable construction or by the fingers of the player, is to provide notes upon the next higher octave. The instrument, because of the fact that it vibrates as a closed tube, can only employ the odd harmonics. Consequently, on shifting from one harmonic to the next harmonic, the note produced by the instrument when the butterfly valves 39 are in any given position, will not be one octave higher. For example, if the instrument has all of its butterfly valves open and produces the note F, on shifting from the fundamental to the third harmonic, the note produced will be the note C a twelfth above, on the next higher octave. The apertures 48 thus provide for the notes F, G, A and B upon the next higher octave. In this type, nearly all the shortening of the instrument is done between the closed end and vibration exciter. This is made possible by this invention. It will be noted that in this type, the keys controlling the butterfly valves correspond to the white keys on the piano. All notes are bell notes when the slide or tube 46 is used.

The modification disclosed in Figure 6 is quite similar to the modification disclosed in Figure 4 with the exception that the portion 50 of the tube instead of being a cylindrical tube is tapered or frusto-conical. The portion 51 is cylindrical and is provided with the slidable tube 52 having the bell 53 which is of much more gradual curvature than the bell 47. Consequently, this instrument is like a conical tube except for the cylindrical portion 51. In effect, it vibrates or "speaks" as a cylindrical tube open at both ends, this being a characteristic of a conical tube. It is immaterial whether the outer end of the section 50 is closed or open, because of the fact that a conical tube when closed at one end will speak as of a cylindrical tube open at both ends. The tube in this modification is reversely bent as indicated at 54, and has the exciter or mouthpiece 55 located at the bend and directed toward the bell 53. The portion 51 is provided with butterfly valves 56 operable by means of rods 57 which join the butterfly valves to their respective keys or levers 58 mounted on the keyboard or bridge 59. As this instrument speaks as of a tube open at both ends regardless of whether the end of the section 50 is open or closed, when the operator shifts from the fundamental to the second harmonic, the note produced will be one octave higher. Consequently, it is not necessary to provide apertures in the tube 52 corresponding to the apertures 48. The tube 52 is slidable upon the tube portion 51 so that it can be moved backward and forward slightly to produce sharps or flats as desired. The tubes 46 and 52 by reason of the fact that they are slidable and can vary the length of the tube, can be effectively used for tuning the instrument, and if desired, suitable springs (not shown) can be employed to urge these tubes into a normal position, wherein, the valves on being opened, will produce naturals as distinguished from sharps and flats. All tones of the instrument in this form of the invention are bell tones.

The exciter of vibration shown in the drawings indicated as 13 and 22 of Figs. 1 and 3 respectively, are of the common type of mouth pieces such as used for clarinets, oboes, saxophones and the like.

From the above described constructions, it will be appreciated that an improved musical instrument is provided which consists essentially of a tube which has the exciter located between its ends. By such a construction the instrument has a very great compass, it being quite easy to play the instrument over a relatively large number of octaves. By varying the material of which the instrument is made, and also by varying its size, instruments can be produced which sound the same as practically all of the conventional band wind instruments.

It will be understood that various changes in the details of construction may be made without departing from the spirit or scope of the invention as defined by the appended claims.

I claim:

1. A wind musical instrument comprising a tube having a mouth piece at which vibrations may be excited located intermediate its ends, said exciter causing the column of air between the ends of the tube to vibrate as one column.

2. A wind musical instrument comprising a tube, means for exciting vibrations in the tube, said means being located at approximately the center of the tube, said means causing the column of air between the ends of the tube to vibrate as one column.

3. A wind musical instrument comprising a tube which is reversely bent upon itself, means for exciting vibrations for the tube, said means being located at the bend.

4. A wind musical instrument comprising a tube which is reversely bent upon itself at approximately its center, means for exciting vibrations in the tube, said means being located at the bend, said means causing the column of air between the ends of the tube to vibrate as one column.

5. A wind musical instrument comprising a tube, both ends of the tube being capable of being opened, said tube being adapted to be sounded while both ends are open and a mouth piece at which may be excited vibrations to the air within the tube at a point intermediate its ends.

6. A wind musical instrument comprising a tube, both ends of the tube being capable of being opened, said tube being adapted to be sounded while both ends are open, a mouth piece at which may be excited vibrations to the air within the tube at a point intermediate its ends, and means for varying the effective length of the tube, said means causing the column of air between the ends of the tube to vibrate as one column.

7. A wind musical instrument comprising a tube, both ends of the tube being capable of being opened, said tube being adapted to be sounded while both ends are open and a mouth piece at which may be excited vibrations to the air within the tube at a point approximately at the center of the tube, said means causing the column of air between the ends of the tube to vibrate as one column.

In testimony whereof I have signed my name to this specification.

LOGAN RIVES.